United States Patent
Martyn et al.

(10) Patent No.: US 7,346,838 B2
(45) Date of Patent: Mar. 18, 2008

(54) SYSTEM AND METHOD FOR DISPLAYING DOCUMENT METADATA

(75) Inventors: Michael K Martyn, San Diego, CA (US); Cliff A Lindroth, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 10/672,627

(22) Filed: Sep. 25, 2003

(65) Prior Publication Data

US 2005/0071394 A1    Mar. 31, 2005

(51) Int. Cl.
*G06F 15/00* (2006.01)
*G06F 15/18* (2006.01)

(52) U.S. Cl. .............. 715/229; 715/230; 715/255; 715/271; 700/182

(58) Field of Classification Search .............. 700/185
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,574,898 | A * | 11/1996 | Leblang et al. | 707/1 |
| 5,917,730 | A * | 6/1999 | Rittie et al. | 703/6 |
| 5,923,573 | A * | 7/1999 | Hatanaka | 703/2 |
| 6,289,345 | B1 * | 9/2001 | Yasue | 707/10 |
| 6,397,117 | B1 * | 5/2002 | Burrows et al. | 700/97 |
| 6,557,153 | B1 * | 4/2003 | Dahl et al. | 716/11 |
| 6,587,746 | B1 * | 7/2003 | D'Souza | 700/182 |
| 6,611,725 | B1 * | 8/2003 | Harrison et al. | 700/98 |
| 6,694,508 | B1 * | 2/2004 | Moore et al. | 717/121 |
| 7,086,028 | B1 * | 8/2006 | Davis et al. | 716/11 |
| 7,127,308 | B2 * | 10/2006 | Bigelow | 700/97 |
| 7,194,728 | B1 * | 3/2007 | Sirota et al. | 717/106 |
| 7,222,131 | B1 * | 5/2007 | Grewal et al. | 707/104.1 |
| 7,236,966 | B1 * | 6/2007 | Jackson et al. | 707/1 |
| 2002/0012007 | A1 * | 1/2002 | Twigg | 345/677 |
| 2002/0065844 | A1 * | 5/2002 | Robinson et al. | 707/500 |
| 2002/0073173 | A1 * | 6/2002 | Selvakumar | 709/219 |
| 2002/0099737 | A1 * | 7/2002 | Porter et al. | 707/513 |
| 2002/0183982 | A1 * | 12/2002 | Rauscher | 703/1 |
| 2003/0107602 | A1 * | 6/2003 | Kawai | 345/771 |
| 2003/0229482 | A1 * | 12/2003 | Cook et al. | 703/14 |
| 2004/0002989 | A1 * | 1/2004 | Kaminer | 707/102 |
| 2004/0070613 | A1 * | 4/2004 | Sprague et al. | 345/762 |

(Continued)

OTHER PUBLICATIONS

U.S. Appl. No. 09/451,946, filed Nov. 1999, MacPhail et al.*

(Continued)

*Primary Examiner*—Weilun Lo
*Assistant Examiner*—Steven B. Theriault
(74) *Attorney, Agent, or Firm*—Jeff D. Limon (57) ABSTRACT

A method for displaying metadata placed on a document, includes accepting a command to load a document file that corresponds to the document into a memory of a computing device. The method also includes a computer-aided design application accepting, by way of a command line interface, a command to assign a label to each of a plurality of metadata elements in the document file. The method further includes displaying at least one of the plurality of metadata elements in response to a command to display the label assigned to the at least one of the plurality of metadata elements, thereby allowing a user to verify a value of the at least one of the plurality of metadata elements.

27 Claims, 5 Drawing Sheets

U.S. PATENT DOCUMENTS

| | | | |
|---|---|---|---|
| 2004/0205075 A1* | 10/2004 | LaTurner et al. | 707/100 |
| 2004/0215635 A1* | 10/2004 | Chang et al. | 707/100 |
| 2004/0225390 A1* | 11/2004 | Keller et al. | 700/95 |
| 2004/0236540 A1* | 11/2004 | Tsuji et al. | 703/1 |
| 2005/0033774 A1* | 2/2005 | Brentano et al. | 707/200 |
| 2005/0065903 A1* | 3/2005 | Zhang et al. | 707/1 |
| 2005/0172260 A1* | 8/2005 | Eichstaedt et al. | 717/104 |
| 2005/0209831 A1* | 9/2005 | Jungreis et al. | 703/1 |
| 2005/0210263 A1* | 9/2005 | Levas et al. | 713/182 |
| 2006/0218122 A1* | 9/2006 | Poston et al. | 707/1 |
| 2006/0277604 A1* | 12/2006 | Pandit et al. | 726/22 |

OTHER PUBLICATIONS

Microsoft Computer Dictionary 5th Ed.,Copyright 2002, p. 53.*
Axiomint.com et al. "Title block manager automates batch changes to title blocks" Dec. 2003.*

* cited by examiner

SYSTEM AND METHOD FOR DISPLAYING DOCUMENT METADATA

COPYRIGHT NOTICE

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND OF THE INVENTION

In an engineering design environment, where drawings that specify manufactured parts are being developed, a need arises to check and double check these drawings prior to releasing the drawing to a manufacturing environment. This ensures that the resulting manufactured parts perform their intended functions to the satisfaction of the designer and without misunderstandings between the designer and those individuals in the manufacturing environment who will eventually produce the part. This typically requires that the drawing checking steps be performed by a draftsperson having a level of skill comparable to that of the engineering designer.

In addition to requiring a distinct group of engineering drawing checkers, the actual checking procedure can become a time consuming process that requires the drawing checker to communicate several times with the engineering designer as errors are detected by the drawing checker, corrected by the designer, and rechecked by the drawing checker. Thus, the back-and-forth process of drawing submittal, drawing checking, re-submittal, and drawing re-check, leading up to the eventual release of the drawing to production can take several days. In a fast-paced product design environment, where time to market is critical and where products must be released according to strict schedules, these delays can result in considerable lost revenue and lost market share. In some instances, a company's inability to release a product in time for the product to be demonstrated at a particular event can cause irreparable harm to the company's reputation and business prospects.

BRIEF DESCRIPTION OF THE APPENDICES

Appendix A is a source code listing of a program ("info_tag.mac") and its sub-programs that labels metadata elements present on a document in accordance with an embodiment of the invention.

Appendix B is source code listing of a program ("inqmi.c") that allows a user to examine each metadata label and its corresponding value according to an embodiment of the invention.

Appendix C is a source code listing of a program ("bemi") for performing bulk correcting of metadata labels according to an embodiment of the invention.

DESCRIPTION OF THE EMBODIMENTS

Figure 1:
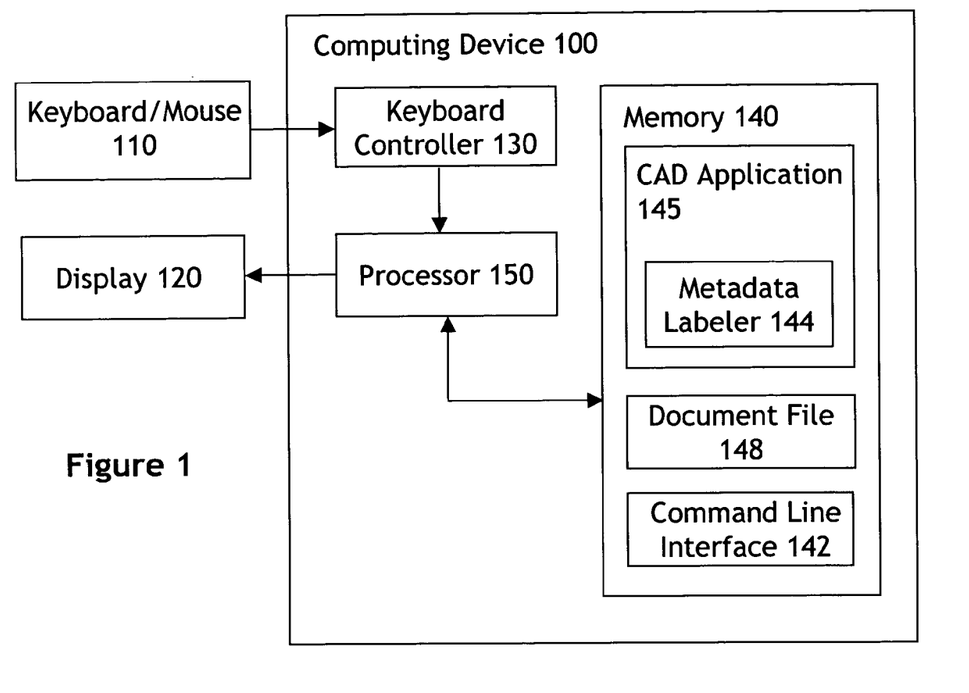
FIG. 1 is a block diagram of a computing device used for verifying and correcting document metadata in accordance with an embodiment of the invention.

FIG. 1 is a block diagram of a computing device used for verifying and correcting document metadata in accordance with an embodiment of the invention. The user of computing device 100 interacts with the computing device by way of keyboard/mouse 110, which supplies electrical signals to keyboard controller 130. Keyboard controller 130 converts these signals into digital commands suitable for processing by processor 150. Processor 150, in turn, places text corresponding to the keyboard inputs onto display 120 for presentation to the user of the computing device. Although referred to in terms of specific devices, keyboard/mouse 110 represents a variety of input devices, such as a trackpad, touchpad, or other device that translates the user's finger or hand motion into the relocation of a cursor or other icon on display 120. Keyboard/mouse 110 may also represent a motion controller that allows the user to pan, zoom, and rotate a 3-dimensional model of an object, or may represent any other input device that enables the user to interact with one or more programs being executed on computing device 100 by way of processor 150.

Computer-aided design (CAD) application 145 has also been loaded into memory 140 of computing device 100. CAD application 145 represents a software application that enables the design of an article of manufacture. Exemplary CAD software applications include ME10, CATIA, UG, Pro/E, Solid Edge, SolidWorks, and a variety of other applications known to those of skill in the art. In the embodiment of FIG. 1, CAD application 145 also supports the conversion of 3-dimensional solid models into 2 dimensional drawings.

In another embodiment of the invention, CAD application 145 represents a software application that performs electronic circuit analysis and modeling. In still another embodiment of the invention, CAD application 145 represents an application that assists in the development of written specifications (such as a specification control drawing) that adheres to government or industry-standard formats.

In the context of FIG. 1, it is contemplated that the documents produced by CAD application 145 include two distinct types of information. As will be more completely described with reference to FIG. 2, the documents produced by CAD application 145 include a portion that describes an article of manufacture. An example of an article of manufacture may be any one of an extremely wide variety of constituent mechanical parts used in consumer products. Another example may be an electrical circuit or system that performs any one of numerous electrical or computer functions. A further example of an article of manufacture may be a complex mechanical, electrical, or computer system that behaves in a particular manner when presented with certain stimuli.

Figure 2:
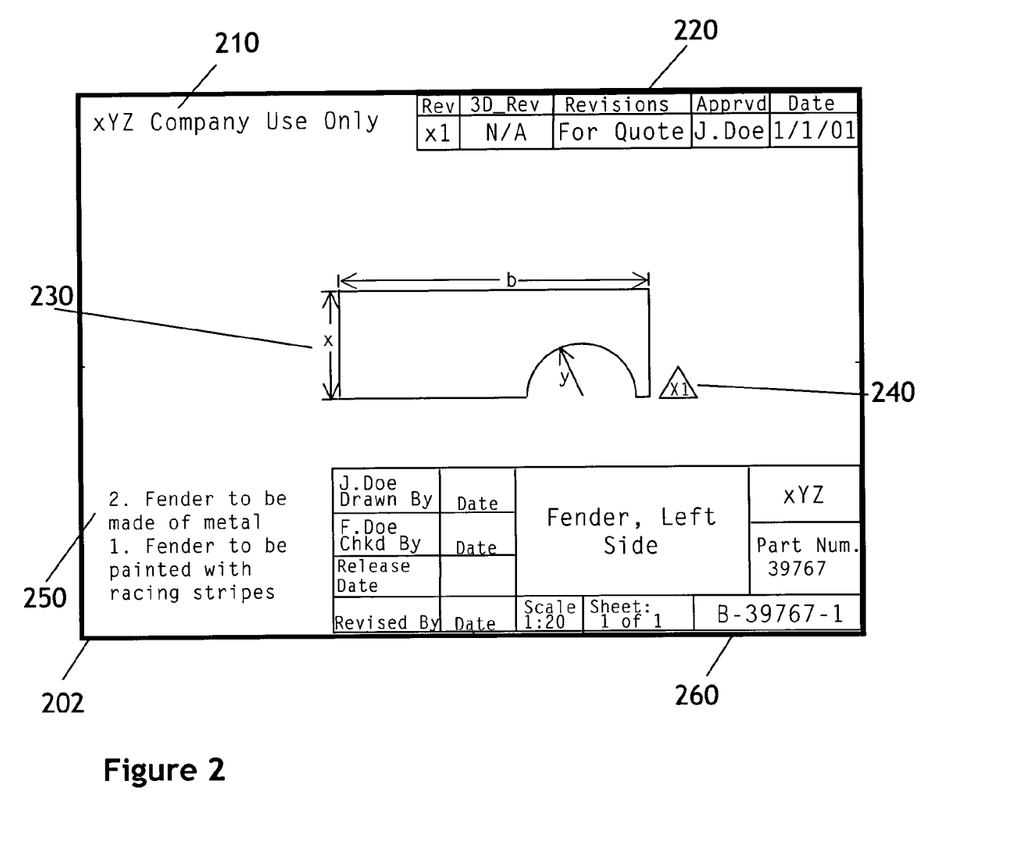
FIG. 2 is an exemplary document showing various metadata that can be verified and corrected by way of an embodiment of the invention.

In addition to the document of FIG. 2 providing information that describes the article of manufacture, such as dimensions, tolerances, material specifications and so forth, the document also includes various "metadata". The term "metadata", as it is used herein, describes information that may be of use to the organization that produced the document and/or the organization that will eventually produce the article of manufacture other than the information that describes the actual article of manufacture. An example of metadata includes the name of the person who prepared the document. Other examples may include the revision code of the particular document, a proprietary rights legend, a release date, and so forth.

In FIG. 1, the user interacts with CAD application 145 to generate document file 148, which also resides within memory 140 of the computing device. Document file 148, which corresponds to document 202 of FIG. 2, is contemplated as being a data file that describes the features and attributes of the article of manufacture being designed.

Also resident within memory 140 is metadata labeler 144, which enables the user of computing device 100 to interact with document file 148 by way of a macro-program that runs within CAD application 145. In the embodiment of FIG. 1, this interaction is brought about by way of command line interface 142 operating in a UNIX shell. By way of command line interface 142, the user can invoke metadata labeler 144 using the UNIX Load <arg1><arg2> command, wherein arg1 represents the file name of document file 148 and wherein arg2 represents name of the metadata labeler program. Appendix A herein includes a source code listing of the program entitled "info_tag.mac", as well as the various other programs called by info_tag.mac. These exemplary programs are macro-programs that run within CoCreate's ME10 or CoCreate's Annotation module of the CoCreate OneSpaceDesigner CAD application. (CoCreate Software, Inc., is located at 3801 Automation Way, Suite 110, Fort Collins, Colo. 80525, Phone: 970.267.8000, www.cocreate.com.) These programs can be used to assign labels to the metadata elements described herein on document files formatted as MI files.

In another embodiment, an exemplary program starts with a DXF formatted file (the DXF format can be generated by many CAD software applications) and then converts the DXF file to an Model Interface (MI) file format using an appropriate file translator prior to the MI file being loaded into the ME10 application. This embodiment may be especially useful in that a DXF file, which can be output from a wide variety of CAD systems, can be used as the document file. A converter, such as the "DXF2MI" translator available from CoCreate may be the most suitable translator.

Although info_tag.mac (of Appendix A) has been written for use with a CoCreate CAD software application, nothing prevents the modification of info_tag.mac to operate within other CAD applications and to support the labeling of metadata present in document files written in other formats. However, other embodiments may require the translation of a document file encoded in a native format to the MI format prior to invoking info_tag.mac, and then translating an MI-formatted file resulting from info_tag.mac back into the native format.

Command line interface 142 may operate by way of a special "pipelined" session of application 145, or may operate independently of CAD application 145. For the command line use of CAD application 145, the application is first initiated by starting the CAD application such that the application accepts commands from an operating system prompt (e.g. a UNIX prompt). In this event, commands entered by way of the keyboard of keyboard/mouse 110 are conveyed directly to the application without the application-generated menus, radio buttons, and other selections being visible to the user. Thus, while command line interface 142 is running, CAD application 145 is running on computing device 100 (or on a server interfaced to computing device 100) in a manner that may not be readily apparent to the user.

FIG. 2 is an exemplary document showing various metadata that can be labeled by way of an embodiment of the invention. In FIG. 2, document 202 is a mechanical drawing that describes an article of manufacture (230) that, for this simple example, has been named "Fender, Left Side". The metadata present on document 202 includes proprietary rights legend 210, revision block 220, revision triangle 240, notes 250, and title block 260. Document 202 may be a single sheet of a drawing that includes multiple sheets, with only one sheet being shown in the figure.

As previously mentioned, document 202 includes two distinct types of information. For this example, the dimensions "x", "b", and "y" represent dimensions of the article of manufacture, while notes 250 represent material and other characteristics of the dimensioned article of manufacture. Also in this example, the proprietary rights legend "xYZ Company Use Only" in the upper left corner of the document, revision block 220 in the upper right corner of the document, revision triangle 240 near the center of the document and the various information in title block 260 of the document represent metadata associated with document 202. Using the metadata-labeling program of Appendix A (info_tag.mac) operating on computing device 100 of FIG. 1, these metadata elements can be labeled in a manner that allows the elements to be referred to by way of these assigned labels. In one embodiment, the labels assigned to each of the metadata elements correspond to the value of the metadata elements.

In an example, at the left side of title block 260, there are "Drawn by" and "Chkd by" (i.e. Checked by) metadata elements. These elements may be assigned labels having a common character string that indicates the value of the metadata element. In this example, since both the "Drawn by" and "Checked by" elements are likely to include one or more personal names, these elements may be assigned labels such as "drawn_by_name" and "checked_by_name", respectively. The values of these metadata elements (J. Doe and F. Doe, respectively) can later be examined by submitting a query, by way of "inqmi.c" of Appendix B for example, that requests all metadata elements having the character string "name" in its label. In an example where document 200 is only the first page of a multi-sheet drawing, each metadata element may carry a corresponding sheet identifier, such as "drawn_by_name_sheet_1". This allows the user to examine the values of the metadata elements present on sheet 1 by way of a request for all metadata elements having the character string "sheet_1" in its label.

In the case of the "checked_by_name" field placed in a table on a single or multi-sheet document, computing device 100 may additionally run a checking routine that compares this field with the name of the person performing the metadata labeling of the document. In the event that the two names do not match, the routine may identify this to the user of the computing device and solicit the user to generate a correction. In another embodiment, the comparison routine may generate the correction automatically. In another example, if the "release" date is incorrect or blank, these can be automatically filled in with the current date.

In the example of FIG. 2, proprietary rights legend 210 indicates that the drawing is for exclusive use by the "xYZ Company". The metadata-labeling program of Appendix A (info_tag.mac) checks this legend to verify that the correct wording has been used. Also in the example of FIG. 2, revision block 220 shows the revision history of the document, with the identifier "x1" being used to indicate that the document has undergone a change, but that the document has not been completely revised to incorporate all of the "x-rev" changes. These changes include the changes identified by revision triangle 240, located in the center of the document. The metadata-labeling program of Appendix A does not identify these revision triangles as being incorrect when the user specifies that the checked document is in the "x-rev" status. However, when the user specifies that the document is in the "released" status, these triangles are identified by the metadata-labeling program of Appendix A as being incorrect. Other potential corrections to document 202, such as removing change bubbles on the document (not shown), removing extraneous notes (not shown), and truncating revision block 220 are also performed by the metadata labeling program of Appendix A when the user specifies the document as specified as being in the "released" state.

Title block 260 includes several elements of metadata that are labeled by the metadata-labeling program of Appendix A (info_tag.mac ). These include the xYZ company logo towards the right side of the company logo, the part number, the sheet identifier, and the names and dates in the "Drawn by", "Checked by", "Released by", and the "File Released by" fields present in title block 220. The user may then list each metadata label and the associated metadata element on an element-by-element basis through the use of the program "inqmi.c" listed in Appendix B herein. The user may then make changes to these metadata elements using inqmi.c, such as inserting correct names, revision codes, titles, part numbers, and so forth. In some instances, computing device 100 (of FIG. 1) may automatically insert corrected information in place of certain metadata elements, such as inserting the current date for the value of the metadata element labeled "release_date".

It should be noted that info_tag.mac labels only the metadata elements located at particular locations of document 202. Thus, for example, in the event that the part number identified in title block 260 occurs at other places on the document, such as on the article of manufacture 230, this information is not identified as being a metadata element. In the embodiment described herein, this metadata element is labeled by info_tag.mac only when the part number occurs in a table, such as in the table that surrounds title block 260.

In the event that document 202 represents only one of a multi-sheet drawing, the user may load the program "bemi" having a source code listing in Appendix C herein. This program, written in the Practical Extraction and Report Language (PERL), allows the user to make more than one change at a time. Thus, in an example in which the "Drawn by" field is incorrect on all sheets of the multi-sheet drawing, the user may invoke "bemi" to perform bulk correcting of the values of the metadata elements. In this event, a change to the metadata element in the "Drawn by" field of one sheet causes the change to be repeated over the remaining sheets of the multi-sheet document. The "bemi" program can also be useful when correcting metadata located in single-sheet documents. For example, in the event that the metadata element "Date" is present at multiple locations on the document, the program "bemi" can be used to repeat the correction at other locations of the single-sheet document.

The PERL program "bemi" of Appendix C receives any number of text element value changes. Thus, all of the labeled text elements of a single sheet or multi-sheet drawing may be changed in one pass through the MI file. This implies that not only can "bemi" change the same text element on each sheet of a multi-sheet drawing (such as the Date present on sheet 1 of a drawing), "bemi" is also capable of changing any or all text elements on all sheets of a multi-sheet drawing (such as the Date present on all sheets).

Figure 3:
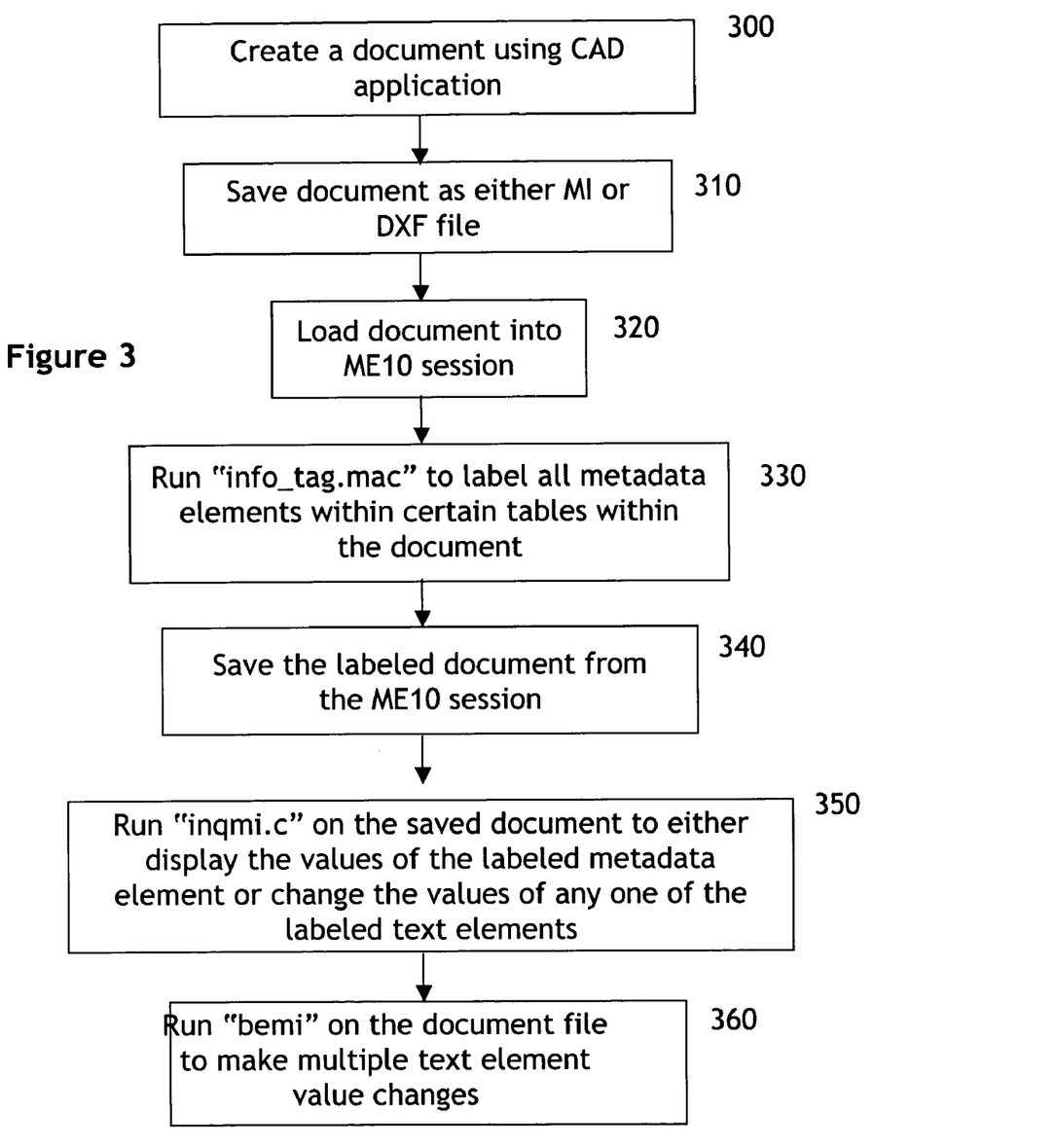
FIG. 3 shows a flowchart for a method for correcting metadata elements using the computer programs of Appendices A, B, and C.

FIG. 3 shows a flowchart for a method for correcting metadata elements using the computer programs of Appendices A, B, and C. The method of FIG. 3 can be performed using computing device 100 of FIG. 1, or may make use of alternative architectures. The method of FIG. 3 begins at step 300, in which a document (such as document 202 of FIG. 2) is created using ME10 or perhaps another software application that outputs a document formatted in either an MI or a DXF file format. At step 310, the document is saved from the software application either as an MI file (if saved from ME10 or CoCreate's OneSpaceDesigner Annotation module) or as a DXF file. The method continues at step 320, in which the document is loaded into an ME10 session in which the info_tag macro has been installed. A command line interface may be used load the document into the ME10 session of step 320.

At step 330, the user invokes the program of Appendix A (info_tag.mac) to label all metadata elements within certain tables within the document. As a result, the user can examine the labels assigned to the metadata elements and the values corresponding to each element. For each entry, such as "drawn_by_name: J. Doe", the user is able to make changes to correct these elements.

While info_tag.mac is being executed, the program may call various sub-programs to perform the following functions. Other embodiments of the invention may include additional functions or may include only some of these functions.

1. Find and label metadata elements present in the Revision and Title blocks.
2. If the document is a drawing, determine the size ("A" size through "E" size) of the drawing.
3. Label the proprietary rights legend.
4. If user has specified that the document is a fully released version, delete revision triangles and delete x-rev indicators (data rows) in the revision block.
5. Find and label document notes.
6. If a metadata element has been left blank, insert characters (such as one or more "x"), thus ensuring that all fields of the revision and title blocks are populated with at least one text element.

Regarding function 6, by populating each block with at least one text element, "inqmi" and "bemi" can be provided with a text element for each field of the revision and title blocks. In embodiments that make use of these programs, the absence of a text element in a field gives rise to a condition in which no metadata is available to be labeled. The resultant file, even after correction, may lack a valid entry and therefore be invalid for release to production.

The method continues at step 340, in which the labeled document is saved from the ME10 session. At step 350, the program of Appendix B (inqmi) is run on the saved document (resulting from step 340) from a command line prompt to either display the values of the labeled text element, or change the values of any one of the labeled text elements. At step 360, the bulk-correcting program of Appendix C ("bemi") is run on the document file from a command line prompt. The bulk-correcting program of step 360 allows the modification of the value of multiple metadata text elements in the document at one time.

Some embodiments of the invention may only include the steps of the computing device loading a computer file corresponding to an article of manufacture into a memory of the computing device (step 320), the computing device assigning labels to the elements of the document metadata present on the document (step 330), and the computing device displaying the labels and a value for each of the elements of the document metadata present on the document (step 350).

Figure 4:
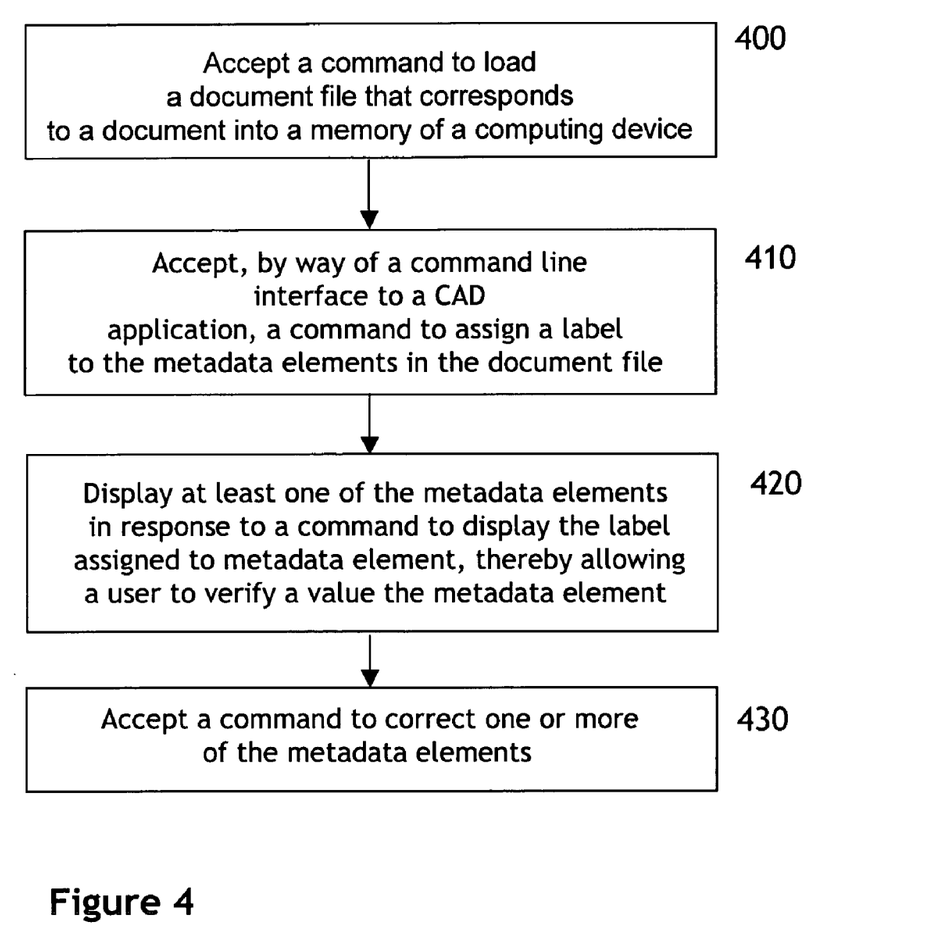
FIG. 4 is a flowchart for a method for correcting metadata placed on a document according to an embodiment of the invention.

FIG. 4 is a flowchart for a method for correcting metadata placed on a document according to an embodiment of the invention. Computing device 100 of FIG. 1 is capable of performing the method of FIG. 4. The method begins with step 400 in which an application accepts, perhaps by way of a command line interface to the application, a command to load a document file that corresponds to the document into a memory of a computing device. The application may be CAD software used to develop documents that describe an article of manufacture, such as a manufactured part, an electrical or computer circuit, or a complex system.

The method continues at step 410, in which the computer-aided design application accepts a command to assign labels to the metadata elements in the document file. The metadata elements may be one or more of a person's name, a revision identifier, and a document title, and so forth. In one embodiment, the labels assigned in step 410 correspond to the value of the metadata elements, such the document title being labeled as "Document_title". At step 420, the metadata elements are displayed in response to a command to display the label assigned to the metadata elements, thereby allowing a user to verify the metadata elements. Step 420 may include displaying incorrect portions of the at least one of the plurality metadata elements in a manner that is discernable from correct portions of the at least one of the plurality metadata elements. For example, in the event that the metadata element corresponding to the label "Release_date" does not correspond to the current day of the month, the day may be highlighted in a manner that distinguishes the day from the year and month.

The method may also include step 430, in which a command to correct one or more of the metadata elements is accepted. This step may include accepting an input generated by a user to correct a metadata element. The step may also include accepting input generated by the computing device to correct the at least one of the plurality of metadata elements. An example of this might include the computing device automatically changing the value of the metadata element corresponding to the label "Release_date" to the current date.

Figure 5:
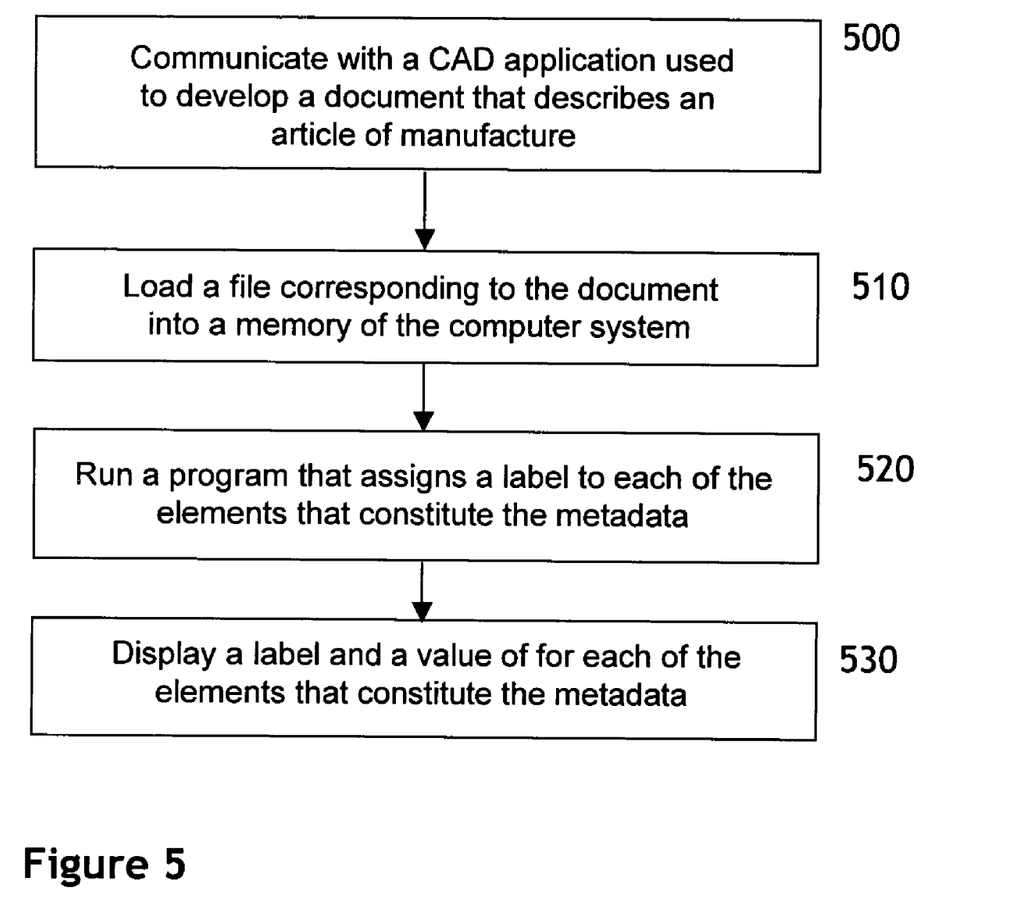
FIG. 5 is another flowchart for a method for correcting metadata placed on a document according to an embodiment of the invention.

FIG. 5 is another flowchart for a method for correcting metadata placed on a document according to an embodiment of the invention. The method of FIG. 5 can be performed using computing device 100 of FIG. 1. The method begins at step 500, which includes a user communicating with a computer-aided design application to develop documents that describe an article of manufacture. The method continues at step 510, in which the application loads a file corresponding to the document into a memory of the computing device. Step 510 may include the user communicating with the application of step 500 by way of a command line interface.

At step 520 elements that constitute the metadata, such as the material in the title block, revision block, and so forth are assigned a label by way of a macro or other program running within the application. At step 530 a label and a value for each of the elements that constitute the metadata are displayed to the user. The displaying of step 530 may include displaying at least a portion of an element determined to be incorrect in a manner that distinguishes the incorrect portion from other displayed metadata. Step 530 may also include receiving a command to display the elements of metadata having a certain character string in the label assigned to each element of metadata.

Some or all of the steps of the methods 3, 4, and 5 may be performed using a computer-readable media that tangibly embodies a program of instructions executable by a computing device (such as computing device 100) to perform the method steps for displaying document metadata on a display coupled to the computing device.

In conclusion, while the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for displaying metadata placed on a document, comprising:

accepting a command to load a document file that corresponds to the document into a memory of a computing device, wherein the document contains drawings and metadata elements and wherein the metadata elements comprise at least one of a person's name, a revision identifier, and a document title, but do not include the drawings or dimensions;

a computer-aided design application accepting, by way of a command line interface, a command to assign a label to each of a plurality of metadata elements in the document file;

displaying only at least one of the plurality of metadata elements in response to a command to display the label assigned to the at least one of the plurality of metadata elements, thereby allowing a user to verify a value of the at least one of the plurality of metadata elements, wherein only metadata elements that are located in predefined locations of the document file are displayed;

determining that at least a portion of one of the plurality of metadata elements is incorrect, wherein when the document is specified as being in a non-released state, the revision identifier is not identified as being incorrect and wherein when the document is specified as being in a released state, the revision identifier is identified as being incorrect; and automatically bulk correcting only the incorrect metadata elements located in the predefined locations by globally repeating the corrections in multiple locations of the document at one time with a batch process, wherein change notes and extraneous notes are removed and revision blocks are truncated automatically during bulk correcting when the document is specified as being in the released state.

2. The method of claim 1, additionally comprising the step of accepting a command to correct the value of the at least one of the plurality of metadata elements.

3. The method of step 2, wherein the accepting a command to correct the value step includes accepting an input generated by the user to correct the value of the at least one of the plurality of metadata elements.

4. The method of step 2, wherein the accepting a command to correct the value step includes accepting an input generated by the computing device to correct the at least one of the plurality of metadata elements.

5. The method of claim 1, wherein the labels assigned to each of the plurality of metadata elements correspond to the value of the plurality of metadata elements.

6. The method of claim 1, wherein the document is a drawing that describes an article of manufacture corresponding to a mechanical part.

7. The method of claim 1, wherein the document is a drawing that describes an article of manufacture corresponding to one of an electrical device or a system that performs a computer function.

8. The method of claim 1, wherein the displaying step further comprises displaying incorrect portions of the at least one of the plurality metadata elements in a manner that is discernable from correct portions of the at least one of the plurality of metadata elements.

9. The method of claim 1, wherein the document is generated by the computer-aided design application.

10. The method of claim 1, wherein the plurality of metadata elements is placed within tables on the document.

11. A computing device that displays metadata placed on a document, comprising:
 a processor that loads a computer file corresponding to the document, the processor assigning a label to at least some of a plurality of metadata elements placed on the document, wherein the document contains drawings and metadata elements and wherein the metadata elements comprise at least one of a person's name, a revision identifier, and a document title, but do not include the drawings or dimensions;
 a user interface that receives a command to display the label and the value corresponding to the at least some of the plurality of metadata elements;
 a display that displays only the label and a value of the at least some of the plurality of metadata elements in response to the received command, wherein only metadata elements that are located in predefined locations of the document file are displayed; and
 a computing device that determines that at least a portion of one of the plurality of metadata elements is incorrect, wherein when the document is specified as being in a non-released state, the revision identifier is not identified as being incorrect and wherein when the document is specified as being in a released state, the revision identifier is identified as being incorrect and wherein the computing device automatically bulk corrects only the incorrect metadata elements located in the predefined locations by globally repeating the corrections in multiple locations of the document at one time with a batch process, wherein change notes and extraneous notes are removed and revision blocks are truncated automatically during bulk correcting when the document is specified as being in the released state.

12. The computing device of claim 11, wherein the user interface operates in a command line mode.

13. The computing device of claim 11, wherein the document is a drawing that specifies an article of manufacture.

14. The computing device of claim 11, wherein the processor performs a correction to the at least some of the values of the plurality of metadata elements in response to a user specifying a correction to one of the values of the plurality of metadata elements.

15. The computing device of claim 14, wherein the document includes a plurality of pages that specifies an article of manufacture, and wherein the display displays the values of metadata elements on one of the plurality of pages in response to the processor receiving a corresponding command.

16. In a computing device, a method for displaying a plurality of metadata elements, comprising:
 a user communicating with a computer-aided design application, the application being used to develop a document that describes an article of manufacture, wherein the document contains drawings and metadata elements and wherein the metadata elements comprise at least one of a person's name, a revision identifier, and a document title, but do not include the drawings or dimensions;
 the application loading a file corresponding to the document into a memory of the computing device;
 the application assigning a label to only the plurality of metadata elements; and
 the computing device displaying a label and a value for the plurality of metadata elements, wherein only metadata elements that are located in predefined locations of the document file are displayed, and wherein the computing device is further configured to determine that at least a portion of one of the plurality of metadata elements is incorrect, wherein when the document is specified as being in a non-released state, the revision identifier is not identified as being incorrect and wherein when the document is specified as being in a released state, the revision identifier is identified as being incorrect and wherein the computing device automatically bulk corrects only the incorrect metadata elements located in the predefined locations by globally repeating the corrections in multiple locations of the document at one time with a batch process, wherein change notes and extraneous notes are removed and revision blocks are truncated automatically during bulk correcting when the document is specified as being in the released state.

17. The method of claim 16, wherein the user communicates with the application by way of a command line interface.

18. The method of claim 16, wherein the computing device further includes ignoring predefined portions of the incorrect metadata elements for documents that are revisions and identifying predefined portions of the incorrect metadata elements for documents that are to be released versions.

19. The method of claim 18, wherein the at least a portion of the one of the plurality of metadata elements determined to be incorrect is displayed in a manner that distinguishes the incorrect portion from other displayed metadata.

20. The method of claim 16, further comprising displaying the values of at least some of the plurality of metadata elements in response to receiving a command to display values corresponding to metadata elements having a certain character string in the assigned label.

21. A system for displaying a plurality of metadata elements of a document file, comprising:
 means for receiving commands to load the document file into a computing device memory, wherein the document contains drawings and metadata elements and wherein the metadata elements comprise at least one of a person's name, a revision identifier, and a document title, but do not include the drawings or dimensions;

means for assigning labels only to the plurality of metadata elements;

means for displaying the labels and the values of the plurality of metadata elements, wherein only metadata elements that are located in predefined locations of the document file are displayed;

means for determining that at least a portion of one of the plurality of metadata elements is incorrect, wherein when the document is specified as being in a non-released state, the revision identifier is not identified as being incorrect and wherein when the document is specified as being in a released state, the revision identifier is identified as being incorrect; and means for automatically bulk correcting only the incorrect metadata elements located in the predefined locations by globally repeating the corrections in multiple locations of the document at one time with a batch process, wherein change notes and extraneous notes are removed and revision blocks are truncated automatically during bulk correcting when the document is specified as being in the released state.

22. The system of claim 21, further comprising means for correcting at least one of the values of the plurality of metadata elements.

23. Computer-readable media, tangibly embodying a program of instructions executable by a computing device to perform method steps for displaying document metadata on a display coupled to the computing device, the method steps comprising:

the computing device loading a computer file corresponding to an article of manufacture into a memory of the computing device, wherein the document contains drawings and metadata elements and wherein the metadata elements comprise at least one of a person's name, a revision identifier, and a document title, but do not include the drawings or dimensions;

the computing device assigning labels to the elements of the document metadata present on the document; and the computing device displaying the labels and a value for each of the elements of the document metadata present on the document, wherein only metadata elements that are located in predefined locations of the document file are displayed, and wherein the computing device is further configured to determine that at least a portion of one of the plurality of metadata elements is incorrect, wherein when the document is specified as being in a non-released state, the revision identifier is not identified as being incorrect and wherein when the document is specified as being in a released state, the revision identifier is identified as being incorrect and wherein the computing device automatically bulk corrects only the incorrect metadata elements located in the predefined locations by globally repeating the corrections in multiple locations of the document at one time with a batch process, wherein change notes and extraneous notes are removed and revision blocks are truncated automatically during bulk correcting when the document is specified as being in the released state.

24. The computer-readable media of claim 23, wherein the method additionally comprises the computing device accepting a command from a user by way of a command line interface.

25. The computer-readable media of claim 23, wherein the metadata elements are only labeled in predefined areas of the document, wherein the metadata elements comprise dimensional data and informational data about the document and wherein the computing device further includes ignoring predefined portions of the incorrect metadata elements for documents that are revisions and identifying predefined portions of the incorrect metadata elements for documents that are to be released versions.

26. The computer-readable media of claim 25, wherein the method further comprises the at least a portion of the element of the document metadata determined to be incorrect being displayed in a manner that distinguishes the incorrect portion from other document metadata.

27. The computer-readable media of claim 23, wherein the method further comprises displaying the values of at least some of the elements of the document metadata in response to receiving a command to display values of document metadata having a certain character string in the assigned label.

* * * * *